May 16, 1967 H. BRAUER 3,319,805
GRIPPING APPARATUS FOR TRANSPORTED PIPES
Filed April 9, 1965 4 Sheets-Sheet 4

INVENTOR
Hans Brauer
by
Michael S. Striker 3,319,805
GRIPPING APPARATUS FOR TRANSPORTED
PIPES
Hans Brauer, Solingen, Germany, assignor to Th.
Kieserling and Albrecht, Solingen, Germany
Filed Apr. 9, 1965, Ser. No. 446,806
Claims priority, application Germany, Apr. 18, 1964,
K 52,736
20 Claims. (Cl. 214—1)

The present invention relates to a gripping apparatus, and more particularly to apparatus for gripping and transporting pipes while the strength of the pipes is tested by a pressure fluid introduced into the interior of each pipe.

Pipe testing machines are known in which rotary carriers support a plurality of gripping means which successively grip and release pipes. While the pipes are gripped and transported by the rotary carrier, the ends of the pipes are closed and pressure fluid is pumped into the moving pipes until the gripping means are opened again and the tested pipes deposited on a suitable support.

Gripping means according to the prior art are provided with double-armed levers, and difficulties are encountered in constructing the gripping means in such a manner that pipes of different diameters can be reliably gripped.

Constructions according to the prior art require particular adjusting means, which are expensive and complicated, and require adjusting operations which are rather time consuming.

It is one object of the invention to provide gripping means which can be used for gripping workpieces, such as pipes, of different size and diameter without requiring any adjustment.

Another object of the invention is to provide gripping means including a pair of gripping members which are moved by drive means toward and away from each other, and include spring-loaded parts which grip the workpiece irrespective of its size and diameter.

Another object of the invention is to provide lost motion between a first operating member controlling the motion of the gripping members, and a second operating member which is capable of a limited independent stroke under the action of resilient means.

An important object of the invention is to provide gripping means for pipes which do not require any adjustment when pipes of different diameters are to be gripped by the gripping means.

With these objects in view, the present invention relates to a gripping apparatus which is advantageously used in pipe testing apparatus. One embodiment of the invention comprises at least one gripping means including two gripping members, and means mounting the gripping members for angular movement about a first axis to and from a gripping position; actuating means including two actuating members connected with said gripping members for relative turning movement about two second axes parallel to the first axis and located on opposite sides of the same; and operating means for reciprocating the actuating means in a direction transverse to the axes. This causes movement of the actuating members relative to the gripping members in such a manner that the gripping members are moved to and from the gripping position.

In the preferred embodiment of the invention, a shaft connects one pair of ends of the gripping members which grip the workpiece with the other ends. A bore is provided between the ends of each gripping member, and an actuating shaft is located in each bore and moved for closing and opening the gripping members by the operating means. In the embodiment of the invention in which the gripping means are used for picking up, transporting, and depositing pipes which are to be tested by pressure fluid, a rotary carrier carries a plurality of circumferentially spaced gripping means, each of which includes two gripping members operable as explained above. A stationary cam means with a circumferential cam track controls a cam follower connected by a lost-motion means with an operating member carrying the actuating shafts. A second operating member, preferably in the form of a cylinder slidingly receiving a piston-shaped portion of the first-mentioned operating member, is directly connected with the cam follower means. A spring is provided between the operating piston and the operating cylinder and urges the piston to move relative to the cylinder to a position for closing the gripping members.

During rotation of the carrier with the gripping means and the cam followers, the gripping means are opened and closed in accordance with the shape of the stationary cam track, and the arrangement is such that the open gripping means close when receiving a pipe on one side of the rotary carrier, whereupon the pipe is carried around along a circular path, and is deposited on the other side of the rotary carrier when the cam means open the gripping means due to the corresponding shape of the cam track. While the closed gripping means transport gripped pipes along the major part of a circle, the ends of the pipes are closed and pressure fluid is inserted to test the strength of the pipes.

In this arrangement, the operating cylinder, the spring-loaded operating piston, and the actuating means move in radial direction in relation to the axis of rotation of the carrier on which the gripping means are mounted.

The gripping members have preferably prismatic surfaces for gripping the pipes, and perform a symmetrical motion when actuated so that the radial distance of the pipes from the axis of rotation of the carrier, does not depend on the diameter of the gripped pipe, and is substantially constant. Minor deviations are compensated by sealing means in the pressure heads which engage the ends of the transported pipes for sealing the same against leakage of pressure fluid.

The lost motion means are preferably constructed as a slot in the operating piston cooperating with a pin secured to the operating cylinder. When the cylinder is moved inwardly by the cam means and cam follower means, the piston is withdrawn by the cylinder only after this latter has moved a certain distance. The shorter inward movement of the piston causes opening of the gripping members. When the operating cylinder is moved outwardly by the cam follower means and cam means, the spring-loaded piston follows such outward movement and actuates the gripping members to engage the pipe whereupon the cylinder may move further outward without taking along the piston so that the gripping members are urged against the pipe by the spring acting on the piston. Since the lost-motion means permit a relative movement between the operating cylinder and the operating piston, the piston performs only a small stroke which is sufficient to open the gripping members so far that even a pipe having a very large diameter can be reliably gripped.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
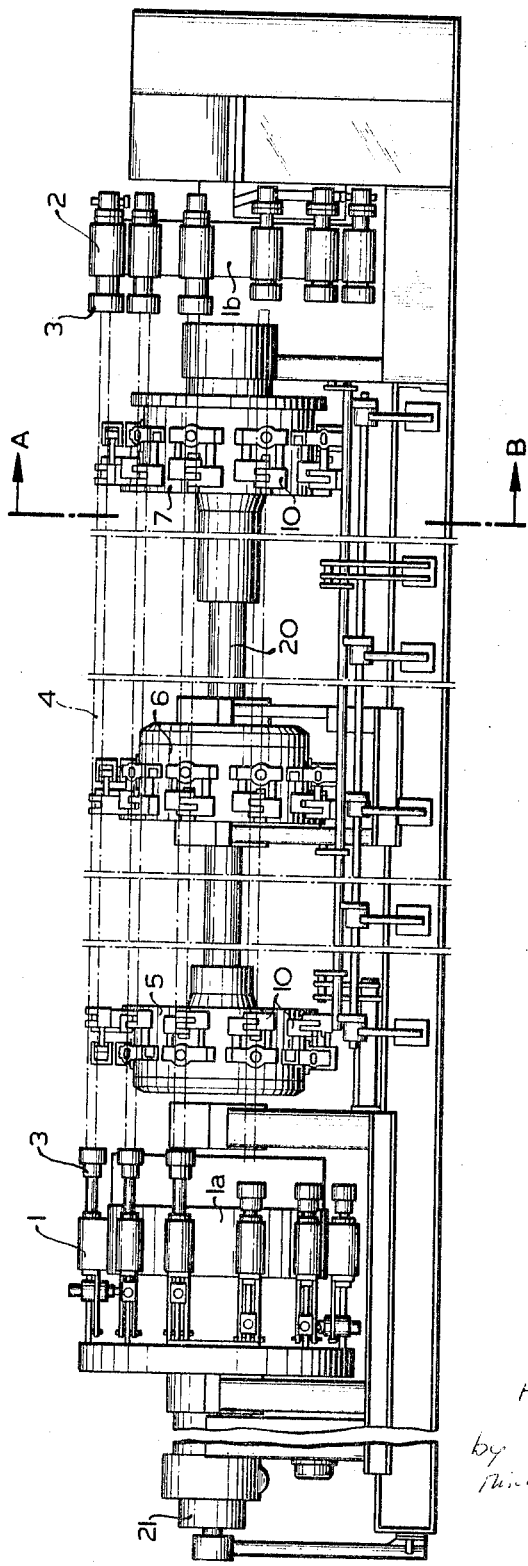
FIG. 1 is a side elevation illustrating a pipe testing apparatus in which the present invention is advantageously used.

Referring now to the drawings, and more particularly to FIG. 1, rotary carriers 1a and 1b carry circumferentially spaced hydraulic motors 1 and 2 which operate pressure heads 3 to move in axial direction of the rotating carriers to close the ends of pipes 4 to be tested while fluid is supplied through the pressure heads 1 into the interiors of the tested pipes 4. A shaft 20 supports carriers 1a and 1b, and also intermediate carriers 5, 6 and 7 on which circumferentially spaced gripping means 10 are mounted, Main shaft 20, and carriers 1a, 5, 6, 7, 1b are rotated by a motor 21.

Figure 2:
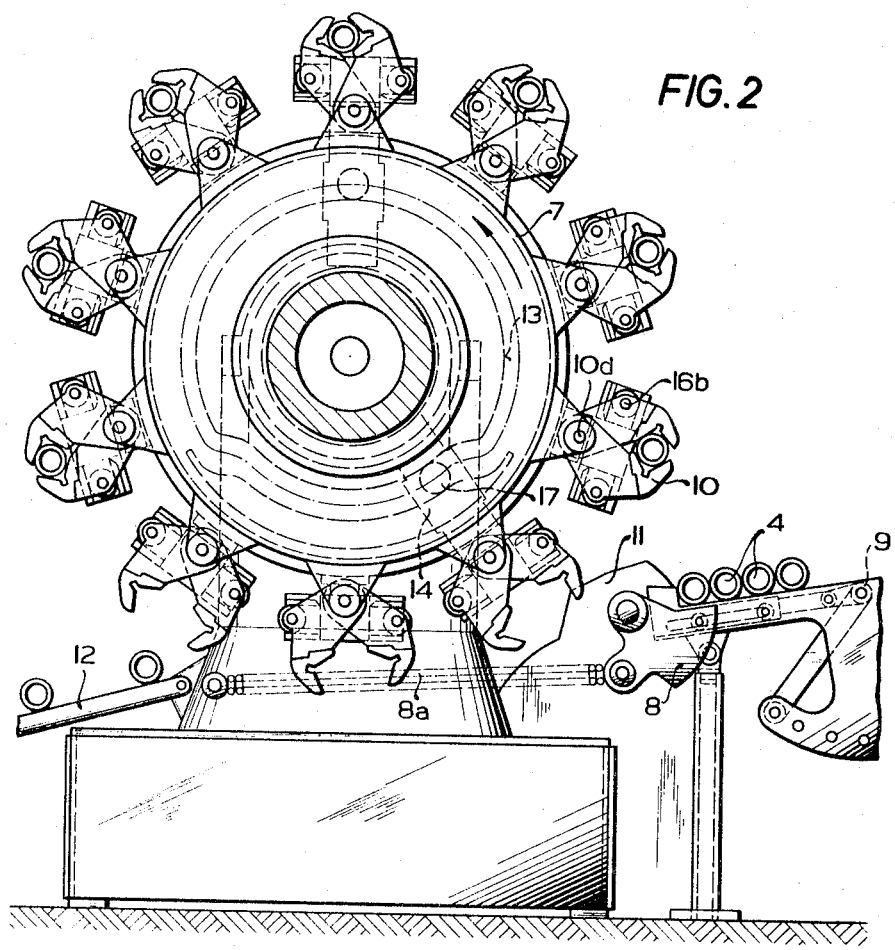
FIG. 2 is a cross-sectional view taken on line A-B in FIG. 1, and illustrating an apparatus according to the invention on a larger scale than FIG. 1.
Figure 3:
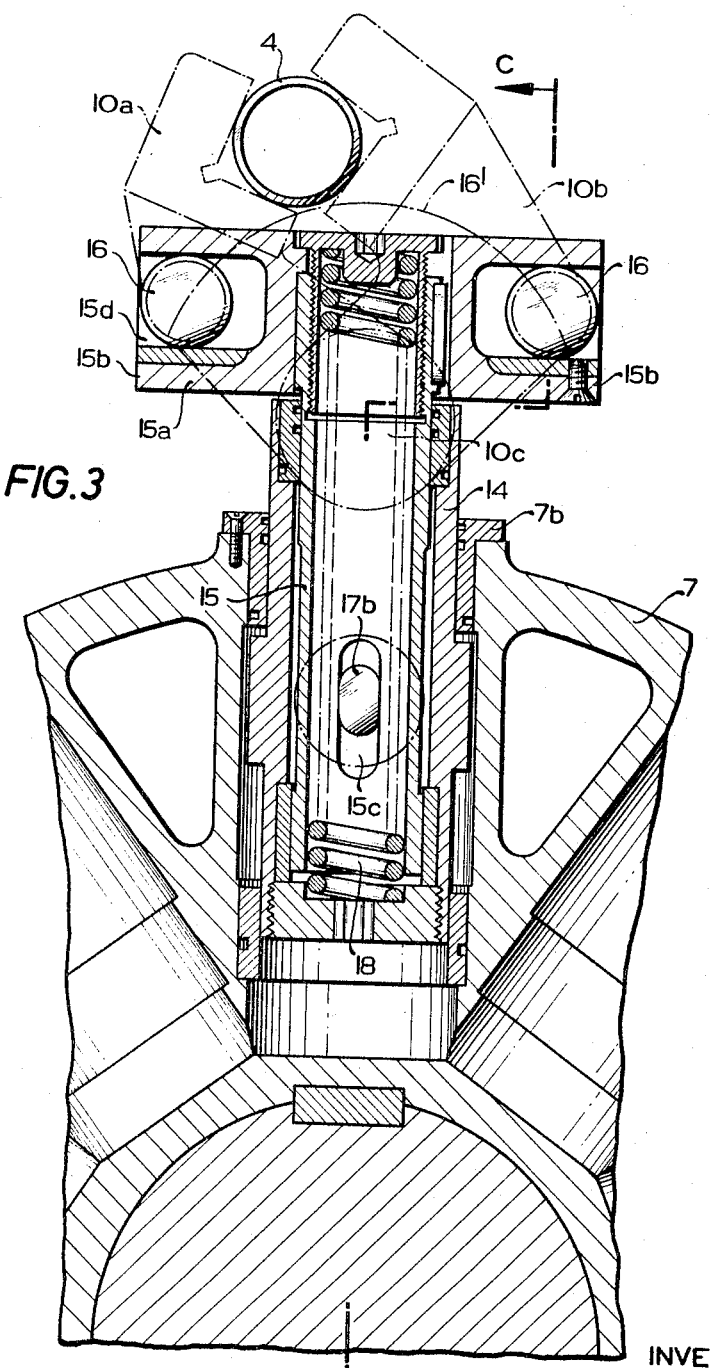
FIG. 3 is a vertical sectional view illustrating one gripping apparatus according to the invention on a larger scale.
Figure 4:
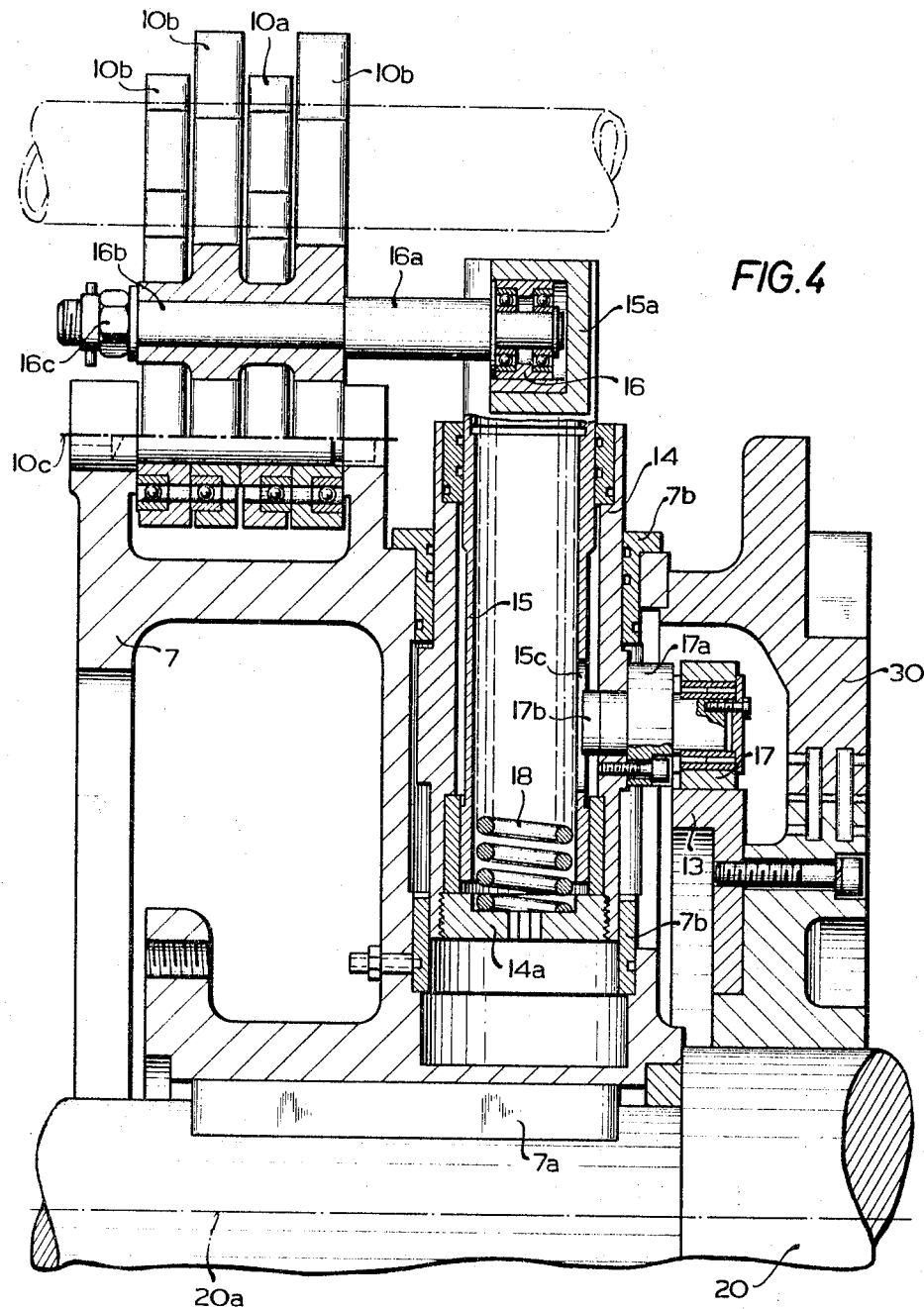
FIG. 4 is a sectional view taken on line C–D in FIG. 3.

Carriers 5, 6 and 7 are constructed as shown for carrier 7 in FIGS. 2, 3 and 4. However, pressure heads 1, and carriers 5 and 6 are movable in the axial direction of the pipes 4 in order to permit the testing of pipes of different lengths. The present invention is not concerned with the construction of the pipe testing apparatus, but with the specific construction of the gripping apparatus by which pipes 4 located on a support 9 are gripped by open gripper means as shown on the right side of FIG. 2, transported with the respective rotary carrier, for example carrier 7 while being tested, and finally deposited on a support 12 on the other side of the carrier by the opened gripping means 10.

In order to facilitate the gripping, a rockable feeding member 8 engages the foremost pipe 4 on the grid-like support 9, and raises the same into a position located between the opened gripping means 10 passing the feeding station.

In the illustrated embodiment, each carrier has ten gripping devices which are opened and closed by cam follower rollers 17 moving along a cam track formed between an inner cam 13 and an outer cam 14.

As shown in FIGS. 3 and 4, each gripping means 10 includes a pair of gripping members 10a, 10b which are mounted at the ends thereof for turning movement about a shaft 10d, shaft 10d having an axis 10c parallel to the main axis 20a of shaft 20 to which carrier 7 is connected for rotation by a key 7a. The carrier includes a guide means 7b in which an operating member 14 of generally cylindrical configuration is mounted for movement in radial direction with respect to axis 20a, and transverse to the axis 10c of the gripping means. A stationary support 30 carries circumferentially extending cams 13 and 14, of which only cam 13 is shown in FIG. 4. A cam follower roller 17 is mounted on a pin member 17a which is secured to the operating member 14 and has a portion 17b projecting into the interior of the same. When carrier 7 rotates with guide means 7b and operating member 14, roller 17 will roll on the cam track of cam 13. As shown in FIG. 2, cam follower roller 17 will be moved inward in radial direction when when arriving at a cam track portion of cam 13 located inwardly of an outer cam 14.

An operating member in the form of a hollow piston 15 is located within operating member 14 and movable in the same in radial direction with respect to the main shaft 20. Operating piston 15 has a slot 15c into which portion 17b of pin 17a projects. Operating member 14 is closed at the inner end by a plate 14a, and a spring 18 abuts plate 14a and a head portion 15a of operating piston 15 so that piston 15 is urged outwardly in radial direction. Head portion 15a has two portions 15b projecting in opposite circumferential directions, as best seen in FIG. 3. Head portions 15b have slots 15d forming guideways extending in tangential direction, and guiding slide members 16 in the form of ball bearings. Shafts 16a are respectively mounted in ball bearings 16 for turning movement and have shaft portions 16b located in bores of gripping members 10a and 10b, and secured to the same by nuts 16c.

Operating piston 15 with shafts 16a can perform a limited outward movement relative to operating cylinder 14 until the end of slot 15c is engaged by pin portion 17b. If a pipe 4 is gripped by the gripping members 10a and 10b, the lower edge of slot 15c will not abut pin portion 17b. If no pipe is gripped, piston 15 will move outwardly until the lower end of slot 15c abuts pin portion 17b, and gripping members 10a, 10b will be located closely adjacent to each other.

During rotation of carrier 7, or 5, 6, operating cylinder 14 rotates with guide means 7b and carrier 7, moving pin 17a together with cam follower roller 17 along the cam track defined by cams 13 and 14. When the respective cam follower roller 17 arrives at the left end of cam 14, see FIG. 2, the cam follower roller 17 is urged inward together with operating cylinder 14. At first, pin portion 17b moves in slot 15c without withdrawing operating piston 15, but when the lower end of slot 15c is engaged by pin portion 17b, operating piston 15 will be retracted in inward direction, so that ball bearings 16 are pulled inwardly in radial direction while moving along a circular path 16′ whose center is located in the axis 10c. Consequently, ball bearings 16 move outwardly in opposite directions in slots 15d, while the gripping members 10a and 10b move apart and open as shown in the left lower portion of FIG. 2.

As long as cam follower roller 17 moves along the inner cam track of cam 14, the gripping means 10 remain open. When the right end of cam track 14 is reached by a cam follower roller 17, the cam follower roller is moved outward together with pin 17a and operating cylinder 14. Spring 18 urges operating piston 15 to a position in which the lower end of slot 15c abuts pin portion 17b so that piston 15 moves with operating cylinder 14. This causes gradual closing of the gripping members 10a and 10b. Before the same close, feeding member 8 is operated by a device 8a to turn in counterclockwise direction as viewed in FIG. 2 so that the foremost pipe 4 on the slanted support 9 is raised and rolls over an inwardly slanted guide surface of a guide member 11 into the still open gripping means 10 which close while pipe 4 is still located on guide member 11. The lower gripping member crosses in this moment the guide surface of guide member 11 so that the pipe cannot roll out of the gripping means.

As soon as the gripping members 10a, 10b engage and grip a pipe 4, further outward movement of pin portion 17b and of cam follower roller 17 on cam track 13 will not cause an increase of the pressure of the gripping member on the grip pipe, since pin portion 17b moves away from the lower edge of slot 15c due to the fact that operating piston 15 is stopped by the held pipe, the gripping members in gripping position, and ball bearings 16 which cannot move inwardly on the circular path 16′ after the pipe is gripped. The gripping force of gripping members 10a and 10b is produced only by spring 18 urging the operating piston 15 upward.

Depending on the diameter of the gripped pipe, the operating piston 15 will stop sooner or later, while the operating cylinder continues its movement under the control of cam 13, and the necessary relative movement between the operating cylinder 14 and the operating piston 15 is made possible by the lost-motion means 15c, 17b.

As a result, the operating piston performs a much shorter stroke than the operating cylinder and the cam follower roller, and the geometrical conditions determined by the radius of circle 16′, and the distance of the guideways 15d from axis 10c, can be selected in such a manner as to permit a movement of the gripping members between a wide open position and a closed position so that pipes within a very wide range of diameters can be reliably gripped by the gripping means according to the present invention.

Any pipe is gripped in the region of guide member 11 by three aligned gripping means which are respectively mounted on carriers 5, 6 and 7. Cam means 13 and 14 have corresponding cam tracks so that the gripping operations are carried out simultaneously. The gripped pipe will be transported by three closed gripping means 10 along a circular path, and released when the respective cam follower rollers of the gripping means are guided inwardly by the left ends of cams 14, as shown in FIG. 2. The gripped pipe travels along the major part of a circle, and during such movement, the pressure heads 3 are operated to engage and seal the ends of the transported pipes 4 so that pressure fluid can be inserted into the same to test the pipes. Supply of pressure fluid is automatically interrupted, and the pressure heads 3 are withdrawn from any pipe arriving in the region of the left end of cams 14 so that the pipe can be discharged onto the slanted table 12 without interfering with the pressure heads 3. The operation of the pressure heads is not an object of the invention.

It will be understood that each of the elements described above, or two or more together, may also find a useful application in other types of gripping arrangements differing from the types described above.

While the invention has been illustrated and described as embodied in a gripping apparatus for a pipe testing machine in which the pipes are held by resilient pressure between pairs of gripping means and are automatically discharged after the testing operation, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Gripping apparatus comprising, in combination, carrier means; at least one gripping means including two gripping members, and means mounting said gripping members on said carrier means for angular movement about a first axis to and from a gripping position; actuating means including two actuating members connected with said gripping members, respectively, for relative turning about two parallel second axes parallel to said first axis and located on opposite sides of the same; operating means including first and second operating members movable in a direction transverse to said axes, said first operating member being connected with said actuating means for moving the same in said transverse direction, lost-motion means connecting said first and second operating members for relative movement in said transverse direction, biasing means for urging said first operating member to a position in which said actuating members urge said gripping members to said gripping position; and drive means for reciprocating said second operating member and by said lost-motion means also said first operating member, said lost-motion means permitting movement of said first operating member relative to said second operating member by said biasing means for a limited distance whereby workpieces of different size can be gripped between said gripping members.

2. Gripping apparatus comprising, in combination, carrier means; at least one gripping means including two gripping members, and means mounting said gripping members for angular movement about a first axis toward and away from each other to and from a gripping position; actuating means including two actuating members connected with said gripping members, respectively, for relative turning about two parallel second axes parallel to said first axis and located on opposite sides of the same; operating means including first and second operating members movable in a direction transverse to said axes, said first operating member being connected with said actuating means for moving the same in said transverse direction, lost-motion means connecting said first and second operating members for relative movement in said transverse direction, said lost-motion means including a slot formed in one of said operating members, and a pin on the other operating member located in said slot; biasing means for urging said first operating member to a position in which said actuating members urge said gripping members to said gripping position; and drive means for reciprocating said second operating member and by said lost-motion means also said first operating member, said lost-motion means permitting movement of said first operating member relative to said second operating member by said biasing means for a limited distance whereby workpieces of different size can be gripped between said gripping members.

3. Gripping apparatus comprising, in combination, carrier means; at least one gripping means including two gripping members, and means mounting the ends of said gripping members on said carrier means for angular movement about a first axis toward and away from each other to and from a gripping position; actuating means including two actuating members connected with said gripping members, respectively, for relative angular movement about two parallel second axes parallel to said first axis and located on opposite sides of the same spaced from said ends; operating means including first and second operating members movable in a direction transverse to said axes, said first operating member being connected with said actuating means for moving the same in said transverse direction, lost-motion means connecting said first and second operating members for relative movement in said transverse direction, spring means for urging said first operating member to a position in which said actuating members urge said gripping members to said gripping position; and drive means for reciprocating said second operating member and by said lost-motion means also said first operating member, said lost-motion means permitting movement of said first operating member relative to said second operating member by said spring means for a limited distance whereby workpieces of different size can be resiliently gripped between the other ends of said gripping members.

4. Gripping apparatus comprising, in combination, carrier means; at least one gripping means including two gripping members, and means mounting the ends of said gripping members on said carrier means for angular movement about a first axis toward and away from each other to and from a gripping position, said gripping members having holding bores, respectively, parallel to said first axis; actuating means including two actuating shafts located in said bores of said gripping members, respectively, and being turnable about two parallel second axes parallel to said first axis and located on opposite sides of the same spaced from said ends; operating means including first and second operating members movable in a direction transverse to said axes, said first operating member being connected with said actuating means for moving the same in said transverse direction, lost-motion means connecting said first and second operating members for relative movement in said transverse direction, spring means for urging said first operating member to a position in which said actuating shafts urge said gripping members to said gripping position; and drive means for reciprocating said second operating member and by by said lost-motion means also said first operating member, said lost-motion means permitting movement of said first operating member relative to said second operating member by said spring means for a limited distance whereby workpieces of different size can be resiliently gripped between the other ends of said gripping members.

5. Gripping apparatus comprising, in combination, movable carrier means; at least one gripping means including two gripping members, and means mounting the ends of said gripping members on said carrier means for angular movement about a first axis toward and away from each other to and from a gripping position; actuating means including two actuating members connected with said gripping members, respectively, for relative angular movement about two parallel second axes parallel to said first axis and located on opposite sides of the same spaced from said ends; operating means including first and second operating members movable in a direction transverse to said axes, said first operating member being connected with said actuating means for moving the same in said transverse direction, lost-motion means connecting said first and second operating members for relative movement in said transverse direction, spring means for urging said first operating member to a position in which said actuating members urge said gripping members to said gripping position; and drive means including stationary cam means, and cam follower means connected with said second operating member for reciprocating said second operating member and by said lost-motion means also said first operating member, said lost-motion means permitting movement of said first operating member relative to said second operating member by said spring means for a limited distance whereby workpieces of different size can be resiliently gripped between the other ends of said gripping members.

6. Gripping apparatus comprising, in combination, carrier means; at least one gripping means including two gripping members, and means mounting the ends of said gripping members on said carrier means for angular movement about a first axis toward and away from each other to and from a gripping position; actuating means including two actuating members connected with said gripping members, respectively, for relative angular movement about two parallel second axes parallel to said first axis and located on opposite sides of the same spaced from said ends; operating means including first and second operating members movable in a direction transverse to said axes, said first operating member being connected with said actuating means for moving the same in said transverse direction, lost-motion means connecting said first and second operating members for relative movement in said transverse direction, spring means for urging said first operating member to a position in which said actuating members urge said gripping members to said gripping position; guide means for guiding said second operating member in said transverse direction; and drive means for reciprocating said second operating member and by said lost-motion means also said first operating member, said lost-motion means permitting movement of said first operating member relative to said second operating member by said spring means for a limited distance whereby workpieces of different size can be resiliently gripped between the other ends of said gripping members.

7. Gripping apparatus comprising, in combination, movable carrier means; at least one gripping means including two gripping members, and shaft means mounting the ends of said gripping members on said carrier means for angular movement about a first axis toward and away from each other to and from a gripping position, said gripping members having holding bores, respectively, parallel to said first axis; actuating means including two actuating shafts located in said bores of said gripping members, respectively, and being turnable about two parallel second axes parallel to said first axis and located on opposite sides of the same spaced from said ends; operating means including first and second operating members movable in a direction transverse to said axes, said first operating member being connected with said actuating means for moving the same in said transverse direction, lost-motion means connecting said first and second operating members for relative movement in said transverse direction, said lost-motion means including a slot formed in said first operating member, and a pin on said second operating member located in said slot, spring means for urging said first operating member to a position in which said actuating shafts urge said gripping members to said gripping position; guide means for guiding said second operating member in said transverse direction; and drive means including stationary cam means, and cam follower means connected with said second operating member for reciprocating said second operating member and by said lost-motion means also said first operating member, said lost-motion means permitting movement of said first operating member relative to said second operating member by said spring means for a limited distance whereby workpieces of different size can be resiliently gripped between the other ends of said gripping members.

8. Gripping and transporting apparatus comprising, in combination, rotary carrier means turnable about a main axis; a plurality of gripping units mounted on said carrier means circumferentially spaced from each other, each gripping unit including two gripping members, and means mounting said gripping members on said carrier means for angular movement about a first axis parallel to said main axis to and from a gripping position, actuating means including two actuating members connected with said gripping members, respectively, for relative angular movement about two second axes parallel to said main axis and located on opposite sides of said first axis, operating means including first and second operating members movable in radial direction with respect to said main axis, said first operating member being connected with said actuating means for moving the same in said radial direction, lost-motion means connecting said first and second operating members for relative movement in said radial direction, biasing means for urging said first operating member to a position in which said actuating members urge said gripping members to said gripping position; and means for successively reciprocating said second operating members of said gripping units, and by said lost-motion means also said first operating members of said gripping units, said lost-motion means permitting movement of said first operating members relative to said second operating members by said biasing means for a limited distance whereby pipes of different diameter can be gripped between said gripping members.

9. Gripping and transporting apparatus comprising, in combination, rotary carrier means turnable about a main axis; a plurality of gripping units mounted on said carrier means circumferentially spaced from each other, each gripping unit including two gripping members, and means mounting said gripping members on said carrier means for angular movement about a first axis parallel to said main axis to and from a gripping position, actuating means including two actuating members connected with said gripping members, respectively, for relative angular movement about two second axes parallel to said main axis and located on opposite sides of said first axis, operating means including first and second operating members movable in radial direction with respect to said main axis, said first operating member being connected with said actuating means for moving the same in said radial direction, lost-motion means connecting said first and second operating members for relative movement in said radial direction, biasing means for urging said first operating member to a position in which said actuating members urge said gripping members to said gripping position, and a cam follower means connected with each second operating member for radial movement therewith; and stationary cam means having circumferential cam tracks for guiding said cam follower means during rotation of said carrier means with said gripping units so that said second operating members, and by said lost-motion means also said first operating members are successively reciprocated, said lost-motion means permitting movement of said first operating members relative to said second operating members by said biasing means for a limited distance whereby pipes of different diameter can be resiliently gripped between said gripping members.

10. A gripping and transporting apparatus for pipes, comprising, in combination, rotary carrier means turnable about a main axis; a plurality of gripping units mounted on said carrier means circumferentially spaced from each other, each gripping unit comprising a gripping means including two gripping levers, and a shaft mounting the ends of said gripping levers on said carrier means for angular movement about a first axis parallel to said main axis to and from a gripping position, actuating means including two actuating members connected with said gripping levers, respectively, for relative angular movement about two second axes parallel to said main axis and located on opposite sides of said first axis, operating means including first and second operating members movable in radial direction with respect to said main axis, said first operating member being connected with said actuating means for moving the same in said radial direction, lost-motion means connecting said first and second operating members for relative movement in said radial direction, biasing means for urging said first operating member to a position in which said actuating members urge said gripping levers to said gripping position; and means for successively reciprocating said second operating members of said gripping units, and by said lost-motion means also said first operating members of said gripping units, said lost-motion means permitting movement of said first operating members relative to said second operating members by said biasing means for a limited distance whereby pipes of different diameter can be gripped between the other ends of said gripping levers.

11. A gripping and transporting apparatus for pipes, comprising, in combination, rotary carrier means turnable about a main axis; a plurality of gripping units mounted on said carrier means circumferentially spaced from each other, each gripping unit comprising a gripping means including two gripping levers, and a shaft mounting the ends of said gripping levers on said carrier means for angular movement about a first axis parallel to said main axis to and from a gripping position, actuating means including two actuating members connected with said gripping levers, respectively, for relative angular movement about two second axes parallel to said main axis and located on opposite sides of said first axis, operating means including first and second operating members movable in radial direction with respect to said main axis, said first operating member being connected with said actuating means for moving the same in said radial direction, lost-motion means connecting said first and second operating members for relative movement in said radial direction, biasing means for urging said first operating member to a position in which said actuating members urge said gripping levers to said gripping position, and a cam follower means connected with each second operating member for radial movement therewith; and stationary cam means having circumferential cam tracks for guiding said cam follower means during rotation of said carrier means with said gripping units so that said second operating members, and by said lost-motion means also said first operating members are successively reciprocated, said lost-motion means permitting movement of said first operating members relative to said second operating members by said biasing means for a limited distance whereby pipes of different diameter can be resiliently gripped between the other ends of said gripping levers.

12. Gripping and transporting apparatus for pipes, comprising, in combination, rotary carrier means turnable about a main axis; a plurality of gripping units mounted on said rotary carrier means circumferentially spaced from each other, each gripping unit comprising a gripping means including two gripping levers, and a shaft mounting said gripping levers on said rotary carrier means for angular movement about a first axis parallel to said main axis to and from a gripping position, actuating means including two actuating shafts connected with said gripping levers, respectively, and having second axes parallel to said main axis and located in opposite sides of said first axis spaced from said ends, operating means including a piston member and a cylinder member, said piston member having guideway means and two bearing means slidably mounted in said guideway means and supporting said actuating shafts for turning movement, said piston member and said cylinder member being movable in radial direction with respect to said main axis, lost-motion means including a slot formed in said piston member and a pin located in said slot and secured to said cylinder member, said lost-motion means connecting said piston member with said cylinder member for relative movement in said radial direction, spring means in said cylinder member for urging said piston member to a position in which said actuating shafts urge said gripping levers to said gripping position, and a cam follower means secured to said cylinder member; and stationary cam means having circumferential cam tracks engaged by said cam follower means during rotation of said carrier means with said gripping unit so that said cylinder members, and by said lost-motion means also said piston members are successively reciprocated, said lost-motion means permitting movement of said piston member relative to said cylinder member by said spring means for a limited distance whereby pipes of different diameter can be resiliently gripped between the other ends of said gripping levers.

13. A gripping and transporting apparatus for pipes as set forth in claim 12 including a feeding station on one side of said rotary carrier means, and a delivery station on the other side of said rotary carrier means; and wherein said cam track has between said stations such a shape that said gripping levers are moved away from each other to release a pipe in the region of said delivery station, and are moved to said gripping position in the region of said feeding station for gripping a pipe.

14. An apparatus as set forth in claim 13 wherein said cam track of said cam means is endless and has between said feeding and delivering stations a recessed portion; and wherein each cam follower means includes a cam follower roller rolling on said cam track and being urged by said spring means against the same whereby said gripping levers move away from each other in the region of said recessed cam track portion while one end of said slot of said lost-motion means abuts said pin.

15. An apparatus as set forth in claim 12 wherein said pin of said lost-motion means has a journal located outside of said cylinder; and wherein said cam follower means is a roller rotatably supported on said journal of said pin.

16. An apparatus as set forth in claim 12 wherein said piston member has a head with two head portions projecting in opposite tangential direction with respect to said main axis, each of said head portions having a straight guideway extending in said tangential direction, and wherein said bearing means are ball bearings respectively supported for sliding movement in said guideways, and turnably supporting said actuating shafts; and including means for fixedly securing said actuating shafts to said gripping levers, respectively.

17. An apparatus as set forth in claim 12 wherein said rotary carrier means includes a plurality of angularly spaced radially extending guide means, each guide means slidably supporting said cylinder member of one of said gripping units for movement in radial direction.

18. A gripping apparatus comprising, in combination, gripping means movable to and from a gripping position; actuating means connected with said gripping means for moving the same to and from said gripping position;

operating means including first and second operating members, said first operating member being connected with said actuating means for moving the same, lost-motion means connecting said first and second operating members for relative movement, biasing means for urging said first operating member to a position in which said actuating means urges said gripping means to said gripping position; and drive means for operating said second operating member and by said lost-motion means also said first operating member, said lost-motion means permitting movement of said first operating member relative to said second operating member by said biasing means for a limited distance so that a workpiece is resiliently gripped by said gripping means.

19. A gripping apparatus as defined in claim 18 wherein said gripping means include a pair of gripping members movable between an open position and said gripping position; and wherein said actuating means includes two actuating members respectively connected with said gripping members for operating the same.

20. A gripping apparatus as defined in claim 18 wherein said first operating member is a piston, and said second operating member is a cylinder in which said piston and said biasing means are located so that said piston is biased by said biasing means to move in one direction; and wherein said lost motion means includes a pin and slot connection between said cylinder and said piston.

References Cited by the Examiner

UNITED STATES PATENTS

| | | | |
|---|---|---|---|
| 724,814 | 4/1903 | Cohen | 294—106 X |
| 1,457,198 | 5/1923 | Utley | 294—115 |
| 1,903,097 | 3/1933 | Dunford et al. | 294—115 X |
| 3,054,283 | 9/1962 | Billen et al. | 73—49.5 |
| 3,139,299 | 6/1964 | Bowen | 294—115 X |

GERALD M. FORLENZA, *Primary Examiner.*

MARVIN A. CHAMPION, *Examiner.*

R. G. SHERIDAN, *Assistant Examiner.*